US012618514B2

(12) United States Patent
Nelson et al.

(10) Patent No.: US 12,618,514 B2
(45) Date of Patent: May 5, 2026

(54) VARIABLE VOLUME VESSEL WITH OVER-TRAVEL PROTECTION AND/OR ANTI-BINDING FEATURES

(71) Applicant: BATTELLE SAVANNAH RIVER ALLIANCE, LLC, Aiken, SC (US)

(72) Inventors: David H. Nelson, Aiken, SC (US); Gregory C. Staack, Aiken, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 114 days.

(21) Appl. No.: 18/600,857

(22) Filed: Mar. 11, 2024

(65) Prior Publication Data

US 2024/0309993 A1 Sep. 19, 2024

Related U.S. Application Data

(60) Provisional application No. 63/490,584, filed on Mar. 16, 2023.

(51) Int. Cl.
*F17B 1/26* (2006.01)
*F17B 1/10* (2006.01)
*F17B 1/14* (2006.01)

(52) U.S. Cl.
CPC .................. *F17B 1/26* (2013.01); *F17B 1/14* (2013.01); *F17B 1/10* (2013.01)

(58) Field of Classification Search
CPC ...... F17C 2201/0195; F17C 2201/0176; F17C 2223/0123; F17C 1/00; F17B 1/26; F17B 1/14; F17B 1/10; F17B 1/00; F15B 2201/3153; B65D 21/086; B65D 88/18; B65D 88/005
USPC .... 220/720, 694, 560.06, 666; 92/34, 37, 43
See application file for complete search history.

(56) References Cited

U.S. PATENT DOCUMENTS 2,966,929 A 1/1961 Brown
3,731,595 A * 5/1973 Wentworth, Jr. ........ F16J 15/52 92/37
4,183,289 A * 1/1980 Jinnouchi ................ F16J 3/048 92/39
5,453,376 A * 9/1995 Ek ......................... C05F 17/929 220/666
11,313,516 B2 4/2022 Kurdziel et al.
2022/0034334 A1* 2/2022 Baltes ..................... F15B 1/103

FOREIGN PATENT DOCUMENTS

FR 2687131 A1 * 8/1993 ............... B65G 1/07
JP 55109801 A * 8/1980

OTHER PUBLICATIONS

English Machine Translation of JP-55109801-A (Year: 1980).*
English Machine Translation of FR-2687131-A1 (Year: 1993).*

* cited by examiner

*Primary Examiner* — Laura E. Parker
(74) *Attorney, Agent, or Firm* — Dority & Manning, P.A.

(57) ABSTRACT

In one aspect, a variable volume vessel includes an expandable/contractable bellows along with one or more components and/or features that prevent over-travel of the bellows and/or that prevent binding of the bellow relative to an outer housing of the vessel.

14 Claims, 7 Drawing Sheets

VARIABLE VOLUME VESSEL WITH OVER-TRAVEL PROTECTION AND/OR ANTI-BINDING FEATURES

CROSS-REFERENCE TO RELATED APPLICATIONS

This application is based upon and claims the right of priority to U.S. Provisional Patent Application No. 63/490,584, filed Mar. 16, 2023, the disclosure of which is hereby incorporated by reference herein in its entirety for all purposes.

FEDERAL RESEARCH STATEMENT

This invention was made with government support under Contract No. 89303321CEM000080 awarded by the U.S. Department of Energy. The government has certain rights in the invention.

FIELD

The present subject matter relates generally to variable volume vessels and, more particularly, to a variable volume vessel with over-travel protection and/or anti-binding features.

BACKGROUND

Variable volume vessels are used across many industries. For example, expandable/contractable bellows are often used to receive or deliver fluids (e.g., gases) in a wide variety of applications. Known bellows typically include a plurality of expandable/contractable bellow sections coupled in series or end-to-end to one another via rigid rings. However, current configurations for bellows do not include any means for preventing over-travel of each bellow section. This can lead to a given bellow section expanding/contracting beyond its travel limits. Moreover, when bellows are contained within an outer pressure vessel or other container, the bellow sections will often get hung-up or engage with the outer pressure vessel, leading to binding of the bellows as it is expanding/contracting within the vessel.

Accordingly, improved configurations for a variable volume vessel that addresses one or more of the problems noted above would be welcomed in the technology.

BRIEF SUMMARY

Aspects and advantages of the present subject matter will be set forth in part in the following description, or may be obvious from the description, or may be learned through practice of the present subject matter.

In one aspect, the present subject matter is directed to a variable volume vessel configured in accordance with one or more of the embodiments described herein.

In one embodiment, the variable volume vessel includes expandable/contractable bellows formed from a plurality of bellow sections.

In one embodiment, the variable volume vessel includes components and/or features that prevent over-travel of the expandable/contractable bellows, such as by including components and/or features that prevent each bellow section from expanding/contracting beyond its travel limit.

In one embodiment, the variable volume vessel further includes a containment shell or outer housing that contains the expandable/contractable bellows. The bellows is configured to expand/contract relative to the outer housing.

In one embodiment, the variable volume vessel may include components and/or features that prevent binding of the bellows relative to the outer housing, such as by including components and/or features that facilitate smooth linear travel of the bellows through the outer housing.

In another aspect, the present subject matter is directed to a variable volume vessel. The variable volume vessel includes an outer housing and a bellows positioned within the outer housing. The bellows includes a plurality of bellow sections provided in series with one another, with each bellow section of the plurality of bellow sections being formed by a bellow component extending axially between an adjacent pair of upper and lower guide rings. The bellow component of each bellow section is configured to expand and contract such that a distance defined between the adjacent pair of upper and lower guide rings increases and decreases with expansion and contraction of the bellow component, respectively. In addition, the variable volume vessel includes at least one travel limit rod provided in association with each bellow section, the at least one travel limit rod being configured to prevent over-travel of the respective bellow section.

In one embodiment, the travel limit rod(s) is configured to prevent over-expansion and/or over-contraction of the respective bellow section.

In one embodiment, the travel limit rod(s) extends axially between a lower head end and an upper head end, with the lower head end being positioned below the lower guide ring of the adjacent pair of upper and lower guide rings and the upper head end being positioned above the upper guide ring of the adjacent pair of upper and lower guide rings.

In one embodiment, travel limit rod(s) further includes a contraction control section extending axially between the lower and upper head ends of the travel limit rod(s).

In one embodiment, the lower guide ring of the adjacent pair of upper and lower guide rings defines a first mounting hole and the upper guide ring of the upper and lower guide rings defines a second mounting hole. The travel limit rod(s) extends through the first and second mounting holes such that the lower guide ring is positioned axially between the lower head end of the travel limit rod(s) and the contraction control section of the travel limit rod(s) and the upper guide ring is positioned axially between the upper head end of the travel limit rod(s) and the contraction control section of the travel limit rod(s).

In one embodiment, an outer dimension of the contraction control section is greater than an outer dimension of the first and second mounting holes.

In one embodiment, when the bellows is moved to a fully contracted state, the upper and lower guide rings engage against opposed sides of the contraction control section to prevent further contraction of the bellow section.

In one embodiment, an outer dimension of the upper and lower head ends of the travel limit rod(s) is greater than an outer dimension of the first and second mounting holes.

In one embodiment, when the bellows is moved to a fully expanded state, the lower head end of the travel limit rod(s) engages with the lower guide ring and the upper head end of the travel limit rod(s) engages with the upper guide ring to prevent further expansion of the bellow section.

In one embodiment, at least one guide ring of the adjacent pair of upper and guide rings of at least one adjacent bellow section of the plurality of bellow sections defines a pass-through hole that is axially aligned with the first and second mounting holes, the travel limit rod(s) being configured to pass through the pass-through hole during extension and contraction of the bellow section.

In one embodiment, each bellow section of the plurality of bellow sections shares a common guide ring with an adjacent bellow section of the plurality of bellow sections such that at least one of the upper guide ring of a first bellow section of the plurality of bellow sections corresponds to the lower guide ring of a second bellow section of the plurality of bellow sections positioned immediately above the first bellow section or the lower guide ring of the first bellow section corresponds to the upper guide ring of a third bellow section of the plurality of bellow sections positioned immediately below the first bellow section.

In one embodiment, the variable volume vessel further comprises at least one guide roller provided in operative association with upper and lower guide rings, the at least one guide roller being configured to engage an inner surface of the outer housing.

In a further aspect, the present subject matter is directed to a variable volume vessel. The variable volume vessel includes an outer housing defining a chamber, with an outer perimeter of the chamber being defined at least partially by an inner surface of the outer housing. The variable volume vessel also includes a bellows positioned within the chamber of the outer housing. The bellows includes a plurality of bellow sections provided in series with one another, with each bellow section of the plurality of bellow sections being formed by a bellow component extending axially between an adjacent pair of upper and lower guide rings. The bellow component of each bellow section is configured to expand and contract such that a distance defined between the adjacent pair of upper and lower guide rings increases and decreases with expansion and contraction of the bellow component, respectively. Additionally, the variable volume vessel further includes at least one guide roller provided in operative association with upper and lower guide rings, with the at least one guide roller being configured to engage the inner surface of the outer housing.

In one aspect, the guide roller(s) comprises a roller bracket and a roller component supported by the roller bracket for rotation relative thereto, with the roller component being configured to engage the inner surface of the outer housing during expansion and contraction of the bellow component.

In one embodiment, the guide roller(s) comprises a plurality of guide rollers spaced apart circumferential relative to one another around each of the upper and lower guide rings, with each guide roller of the plurality of guide rollers being configured to engage the inner surface of the outer housing during expansion and contraction of the bellow component.

In one embodiment, the variable volume vessel further includes at least one travel limit rod provided in association with each bellow section, with the at least one travel limit rod being configured to prevent over-travel of the respective bellow section.

In one embodiment, the travel limit rod(s) is configured to prevent both over-expansion and over-contraction of the respective bellow section.

In one embodiment, the travel limit rod(s) extends axially between a lower head end and an upper head end, with the lower head end being positioned below the lower guide ring of the adjacent pair of upper and lower guide rings and the upper head end being positioned above the upper guide ring of the adjacent pair of upper and lower guide rings.

In one embodiment, the travel limit rod(s) further includes a contraction control section extending axially between the lower and upper head ends of the travel limit rod(s). Additionally, in one embodiment, the lower guide ring of the adjacent pair of upper and lower guide rings defines a first mounting hole and the upper guide ring of the upper and lower guide rings defines a second mounting hole. The travel limit rod(s) extends through the first and second mounting holes such that the lower guide ring is positioned axially between the lower head end of the travel limit rod(s) and the contraction control section of the travel limit rod(s) and the upper guide ring is positioned axially between the upper head end of the travel limit rod(s) and the contraction control section of the travel limit rod(s).

These and other features, aspects, and advantages of the present subject matter will become better understood with reference to the following Detailed Description and appended claims. The accompanying drawings, which are incorporated in and constitute a part of this specification, illustrate embodiments of the present subject matter and, together with the description, serve to explain the principles of the present subject matter.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
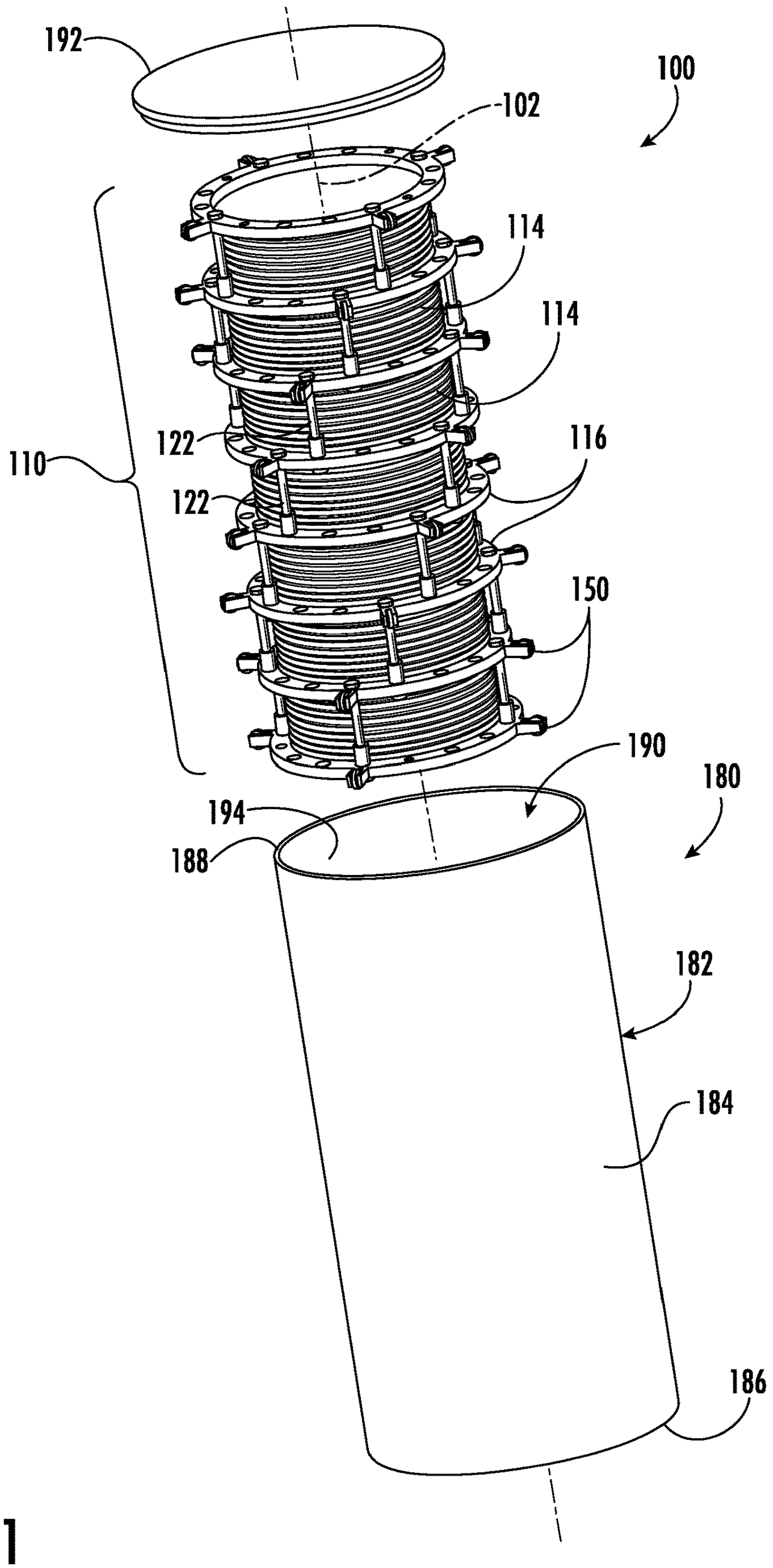
FIG. 1 illustrates a perspective, exploded view of one embodiment of a variable volume vessel in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a variable volume vessel having an expandable/contractable bellows. The bellows generally includes a plurality of bellow sections coupled in series or end-to-end to one another along the axial length of the bellows. In one embodiment, the variable volume vessel also includes an outer containment shell or housing (e.g., a rigid shell or housing) within which the bellows is configured to expand/contract.

In several embodiments, the variable volume vessel includes components and/or features that prevent over-travel of the expandable/contractable bellows. Specifically, in one embodiment, the variable volume vessel includes a plurality of travel limit rods that are provided in operative association with associated guide rings of the bellows. The travel limit rods function to prevent expansion of the bellows beyond a maximum expansion distance and to prevent contraction of the bellows beyond a minimum contraction distance.

Additionally, in several embodiments, the variable volume vessel includes components and/or features that prevent binding of the bellows relative to the outer housing. Specifically, in one embodiment, the variable volume vessel may incorporate guide rollers that extend radially outwardly from one or more of the guide rings. The guide rollers may be configured to roll along the inner surface of the outer housing, thereby facilitating smooth linear travel of the bellows within the housing during expansion/contraction. For instance, numerous guide rollers may be positioned around the outer circumference of each guide ring to ensure smooth linear travel of the bellows through the outer housing.

The travel limit rods function as travel limiting devices. In one embodiment, each rod is positioned symmetrically and circumferentially at a given radius from the center of the variable volume vessel, with multiple rods being installed in association with a given guide ring. In one embodiment, each rod extends parallel to the longitudinal central axis of the variable volume vessel. Additionally, in one embodiment, each rod is positioned radially inwardly from the guide rollers such that the rods are positioned closer to a central axis of the variable volume vessel than the guide rollers.

In one embodiment, each travel limit rod is configured to limit travel of its associated bellow section by having a rod head that defines an outer dimension (e.g., a diameter) that is larger than an associated "mounting hole" on an adjacent guide ring, thereby preventing the rod from passing through such guide ring and, thus, preventing over-expansion. However, the outer dimension of the rod head may be smaller than an outer dimension (e.g., a diameter) of an aligned "pass-through hole" on a successive guide ring, thereby allowing the rod head to pass through such hole during expansion/contraction of the bellows.

Figure 2:
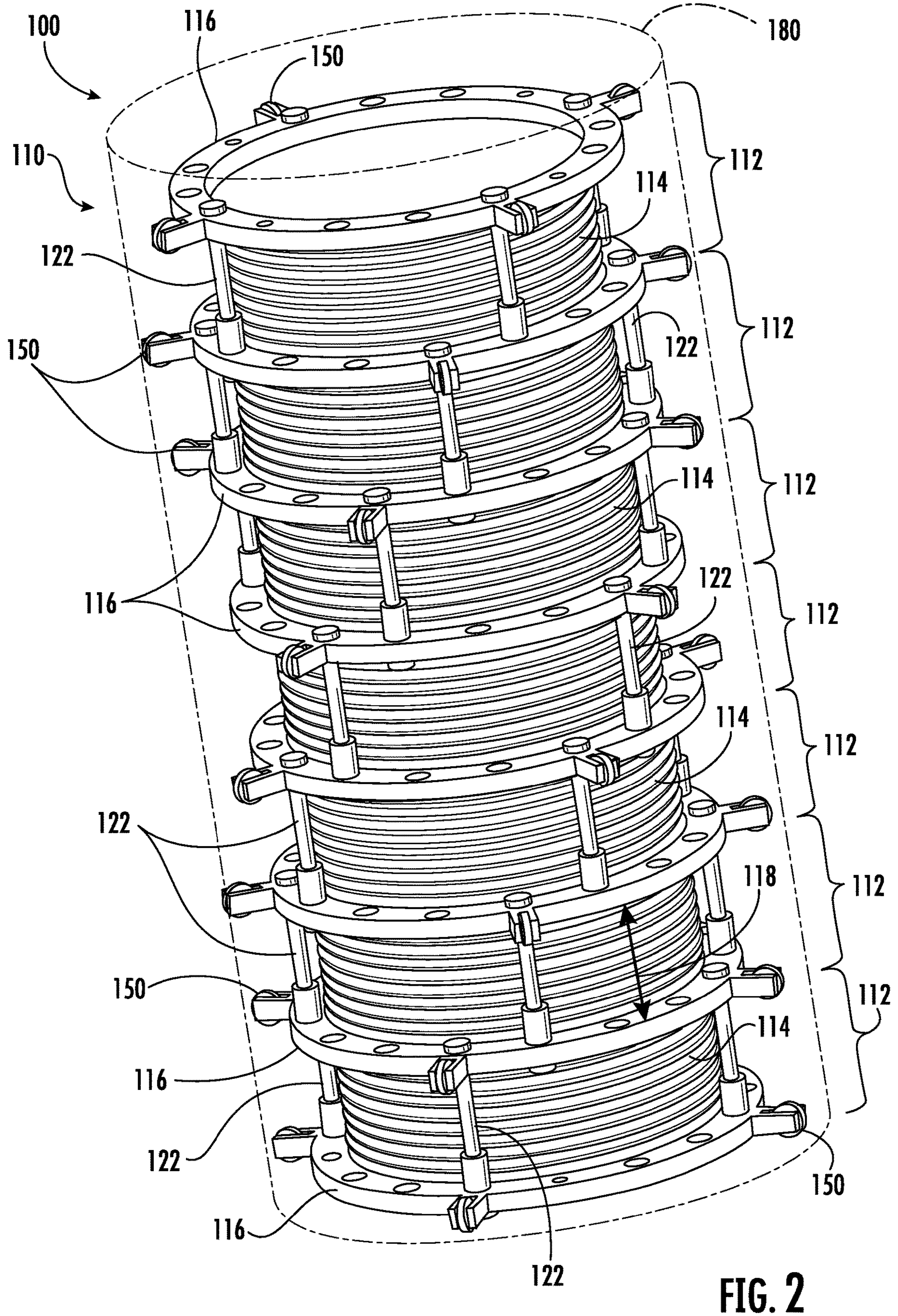
FIG. 2 illustrates a perspective view of a bellows of the variable volume vessel shown in FIG. 1 in a fully expanded state in accordance with aspects of the present subject matter, particularly illustrating the vessel including various components and/or features for preventing over-travel of the bellows and for providing smooth travel relative to an outer containment housing or shell (shown in phantom lines) of the vessel.
Figure 3:
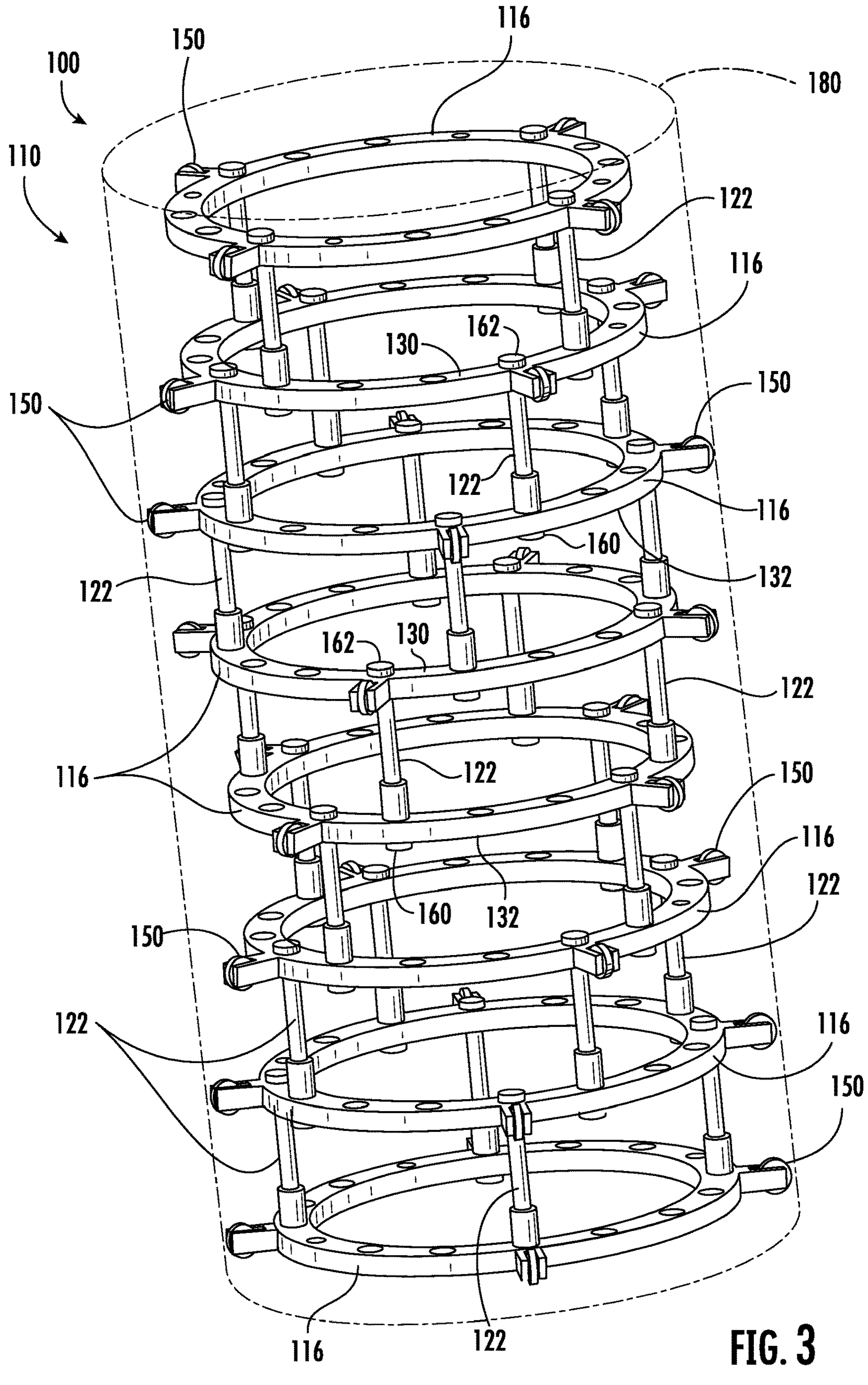
FIG. 3 illustrates the same perspective view of the variable volume vessel shown in FIG. 2 with the various bellow components of the bellows removed for purposes of illustration.
Figure 4:
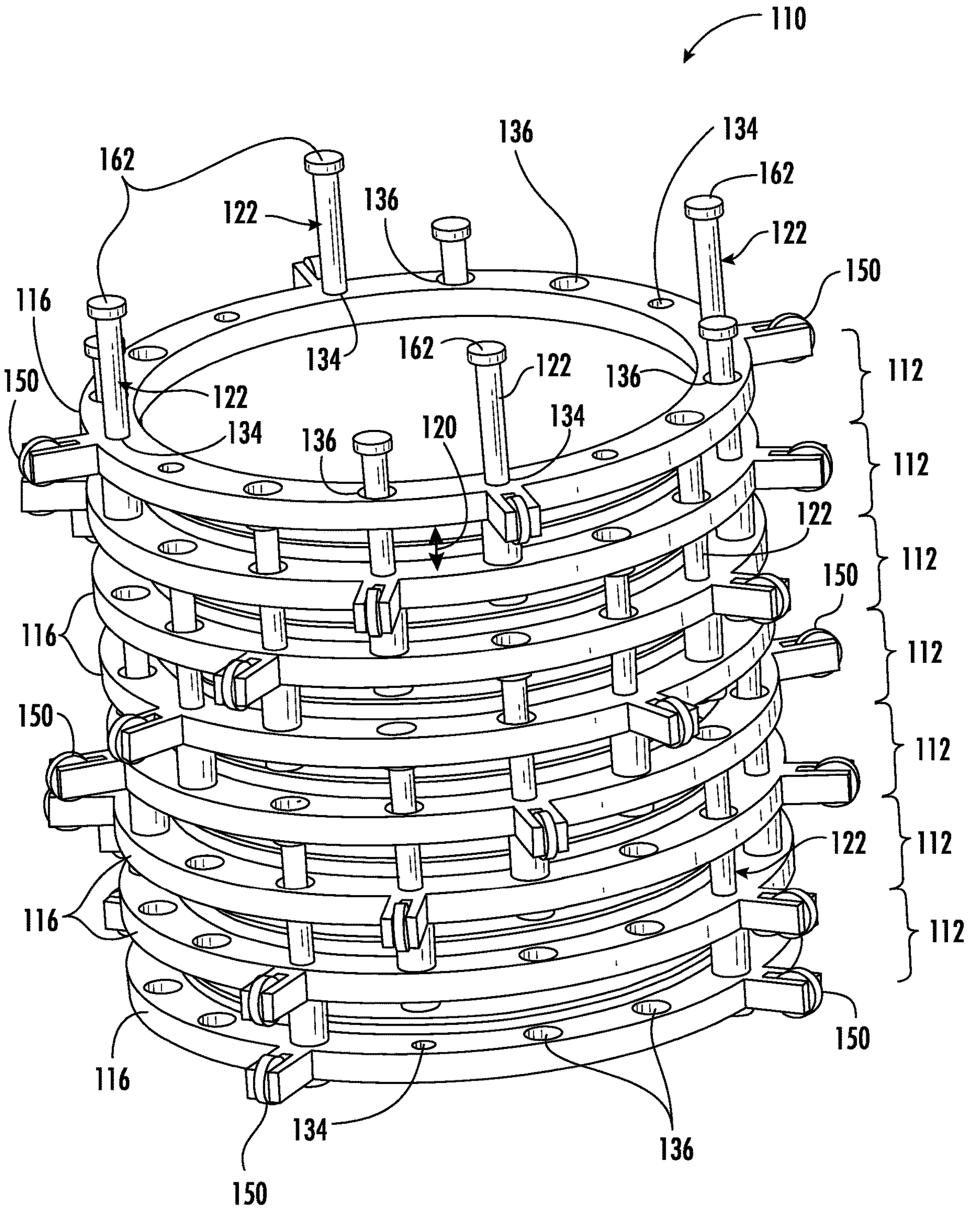
FIG. 4 illustrates another perspective view of the variable volume vessel shown in FIG. 2 with the outer housing removed, particularly illustrating the bellows in a fully contracted state in accordance with aspects of the present subject matter.
Figure 5:
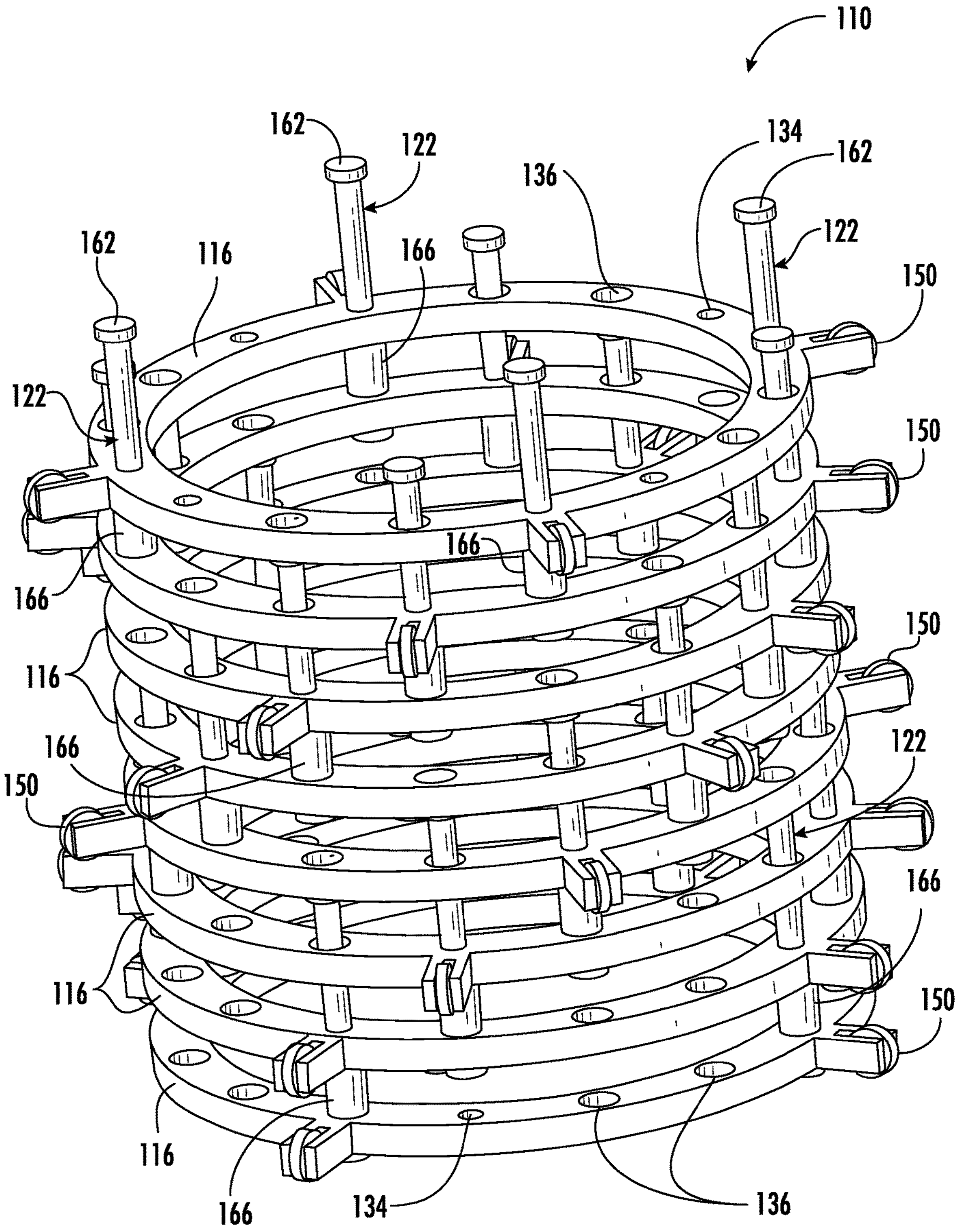
FIG. 5 illustrates the same perspective view of the variable volume vessel shown in FIG. 4 with the various bellow components of the bellows removed for purposes of illustration.

Referring now to the drawings, FIGS. 1-5 illustrate various perspective views of one embodiment of components of a variable volume vessel 100 in both an expanded state (FIGS. 1-3) and a contracted state (FIGS. 4 and 5) in accordance with aspects of the present subject matter. Specifically, FIG. 1 illustrates a perspective, exploded view of the variable volume vessel 100 with a bellows 110 of the vessel 100 being exploded outwardly from an outer containment housing or shell 180 of the vessel 100 along a central axis 102 of the vessel 100. FIGS. 2 and 3 illustrate perspective views of the bellows 110 shown in FIG. 1 in a fully expanded state in accordance with aspects of the present subject matter, with FIGS. 2 and 3 both showing the bellows 110 positioned within the interior of the outer containment housing 180 (shown in phantom lines) and FIG. 3 showing the bellows 110 with its various bellow components removed for purposes of illustration. Additionally, FIGS. 4 and 5 illustrate perspective views of the bellows 110 shown in FIG. 1 in a fully contracted state, with FIG. 5 showing the bellows 110 with its various bellow components removed for purposes of illustration.

As shown in the illustrated embodiment, the variable volume vessel 100 may generally include an expandable/contractable bellows 110 and an outer containment housing or shell 180 (sometimes referred to hereinafter as the "outer housing 180" or simply "housing 180"), with the bellows 110 being configured to be received within the outer housing 180 of the vessel 100. In general, the bellows 110 may be configured to expand/contract within the housing 180. In doing so, as will be described below, the variable volume vessel 100 may additionally include components and/or features that prevent over-travel of the bellows 110 and/or that prevent binding of the bellows 110 relative to the outer housing 180 during expansion and contraction of the bellows 110.

In general, the outer housing 180 may correspond to a rigid or fixed housing, such as a pressure containment vessel. In this regard, the outer housing 180 may be configured, for example, to be sealed or otherwise configured to contain a fluid (e.g., a gas). As particularly shown in FIG. 1, the outer housing 180 may, in one embodiment, be configured as a hollow, cylindrically shaped housing configured to receive the expandable/contractable bellows 110. For instance, the outer housing 180 may include a cylindrically-shaped housing body 182 including a cylindrical wall 184 extending from a closed-end 186 to an open-end 188, with the body 182 generally defining a cylindrically-shaped chamber 190 between its opposed ends 186, 188 for receiving the bellows 110. In such an embodiment, once the bellows 110 is installed axially within the chamber 190 (e.g., along the central axis 102 of the variable volume vessel 100), a cover or end cap 192 may be configured to be installed over the open end 188 of the housing body 182 to enclose the bellows 110 within the outer housing 180 and to seal the housing 180 for allowing a pressurized fluid to be contained therein. In one embodiment, suitable fasteners or other locking/fastening members may be used to secure the end cap 192 to the housing body 182. Additionally, as shown in FIG. 1, the cylindrical wall 184 of the housing body 182 defines an inner cylindrical surface 194 which generally defines the outer perimeter of the chamber 190. As will be described below, certain features of the variable volume vessel 100 (e.g., guide rollers) may be configured to interact with the inner surface 194 of the outer housing 180 during expansion/contraction of the bellows 110 relative to the outer housing 180.

It should be appreciated that the configuration of the outer housing 180 described above and shown in FIG. 1 is simply provided to place the present subject matter in an exemplary field of use. Thus, it should be appreciated that the outer housing 180 may generally have any other suitable configuration that allows the bellows 110 to be received therein. For instance, in other embodiments, the outer housing 180 may additionally include one or more inlets for receiving pressurized fluid therein and/or one or more outlets for expelling pressurized fluid therefrom. Additionally, in other embodiments, the outer shape of the housing 180 may be varied and, thus, does not need to have the illustrated cylindrical shape along its exterior. Moreover, in certain embodiments, the outer housing 180 may be configured to interact with and/or accommodate one or more components for actuating the bellows 110 relative to the housing 180. For instance, in one embodiment, an actuator assembly (e.g., a pneumatic, hydraulic or solenoid-activated cylinder) may generally be positioned exterior of the outer housing 180, with an actuator or piston rod of the actuator assembly extending through a portion of the housing 180 and being coupled to the bellows 110 (e.g., to an end of the bellows 110) to control expansion/contraction of the bellows 110. Alternatively, the actuator assembly may be positioned entirely within the interior of the chamber 190 defined by the housing 180.

As particularly shown in FIGS. 2-5, the expandable/contractable bellows 110 of the variable volume vessel 100 is generally formed by a plurality of bellow sections 112 coupled end-to-end or in series with one another, with each bellow section 112 including an expandable/contractable bellow component 114 (e.g., a metal bellow component) extending between a pair of adjacent guide rings 116 (e.g., an upper guide ring 116 and a lower guide ring 116). As such, each bellow section 112 shares a common guide ring 116 with an adjacent bellow section 112. For instance, an upper guide ring 116 of a first bellow section 112 may also be the lower guide ring 116 of a second bellow section 112 positioned above the first bellow section 112.

The bellow components 114 of the various bellow sections 112 may generally correspond to the expandable/contractable components of the bellows 110. For instance, as shown in the transition between the expanded state of FIG. 2 and the contracted state of FIG. 4, each bellow component 114 may be configured to expand axially to a maximum expansion height or distance 118 (FIG. 2) defined between its respective guide rings 116 and contract axially to a minimum contraction height or distance 120 (FIG. 4) defined between its respective guide rings 116 during expansion/contraction of the bellows 110. In this regard, each bellow component 114 may generally have any suitable bellow-type configuration known in the art that allows for the expansion/contraction of such component 114 between its respective guide rings 116. For instance, each bellow component 114 may have a corrugated or zig-zag configuration to allow for axial expansion/contraction of the bellow component 114 between the guide rings 116.

As shown in the illustrated embodiment, the variable volume vessel 100 also includes a plurality of travel limit rods 122 provided in operative association with the guide rings 116 to prevent over-travel of the bellow sections 112 during expansion/contraction. Specifically, in the views illustrated in FIGS. 2 and 3, the various travel limit rods 122 are shown as functioning to prevent over-expansion of the bellow sections 112 by limiting such expansion to the maximum expansion distance 118 set by the travel limit rods 122. Similarly, in the views illustrated in FIGS. 4 and 5, the various travel limit rods 122 are shown as functioning to prevent over-contraction or over-compression of the bellow sections 112 by limiting such contraction/compression to the minimum contraction distance 120 set by the travel limit rods 122. It should be appreciated that the maximum/minimum distances 118, 120 set by the travel limit rods 122 may be selected based on the specific design of the bellows 110. For instance, the maximum/minimum distances 118, 120 set by the travel limit rods 122 may be selected to prevent over-expansion and/or over-contraction of the various bellow components 114 extending between the guide rings 116, as such components can become damaged due to over-travel conditions (i.e., over-expansion and/or over-contraction) of the bellows 110.

As particularly shown in FIG. 3 (in which the expandable/contractable bellow component 114 of each bellow section 112 has been removed for purposes of illustration), four travel limit rods 122 are provided in operative association with each bellow section 112, with such travel limit rods 122 being spaced circumferentially apart around the associated guide rings 116 of each bellow section 112. For instance, in the illustrated embodiment, the travel limit rods 122 of each bellow section 112 are spaced circumferentially apart from one another by approximately 90 degrees. However, in other embodiments, more or less travel limit rods 122 may be provided in association with each bellow section 112, with such travel limit rods 122 having any suitable circumferential spacing relative to one another. For instance, in one embodiment, only one travel limit rod 122 may be provided in association with each bellow section 112 or two or more travel limit rods 122 may be provided in association with each bellow section. Additionally, as particularly shown in FIG. 3, the set of travel limit rods 122 associated with each bellow section 112 may generally be clocked or circumferentially offset from the set of travel limit rods 122 associated with each adjacent bellow section 112 (e.g., an adjacent upper and/or lower bellow section 112). For instance, in the illustrated embodiment, each set of travel limit rods 122 associated with a given bellow section 112 is clocked or circumferentially offset from the set of travel limit rods 122 associated with each adjacent bellow section 112 by a given circumferential offset ranging from greater than zero degrees to less than 45 degrees, such as greater than 5 degrees and less than 40 degrees or greater than 10 degrees and less than 35 degrees or greater than 15 degrees and less than 30 degrees.

Figure 6:
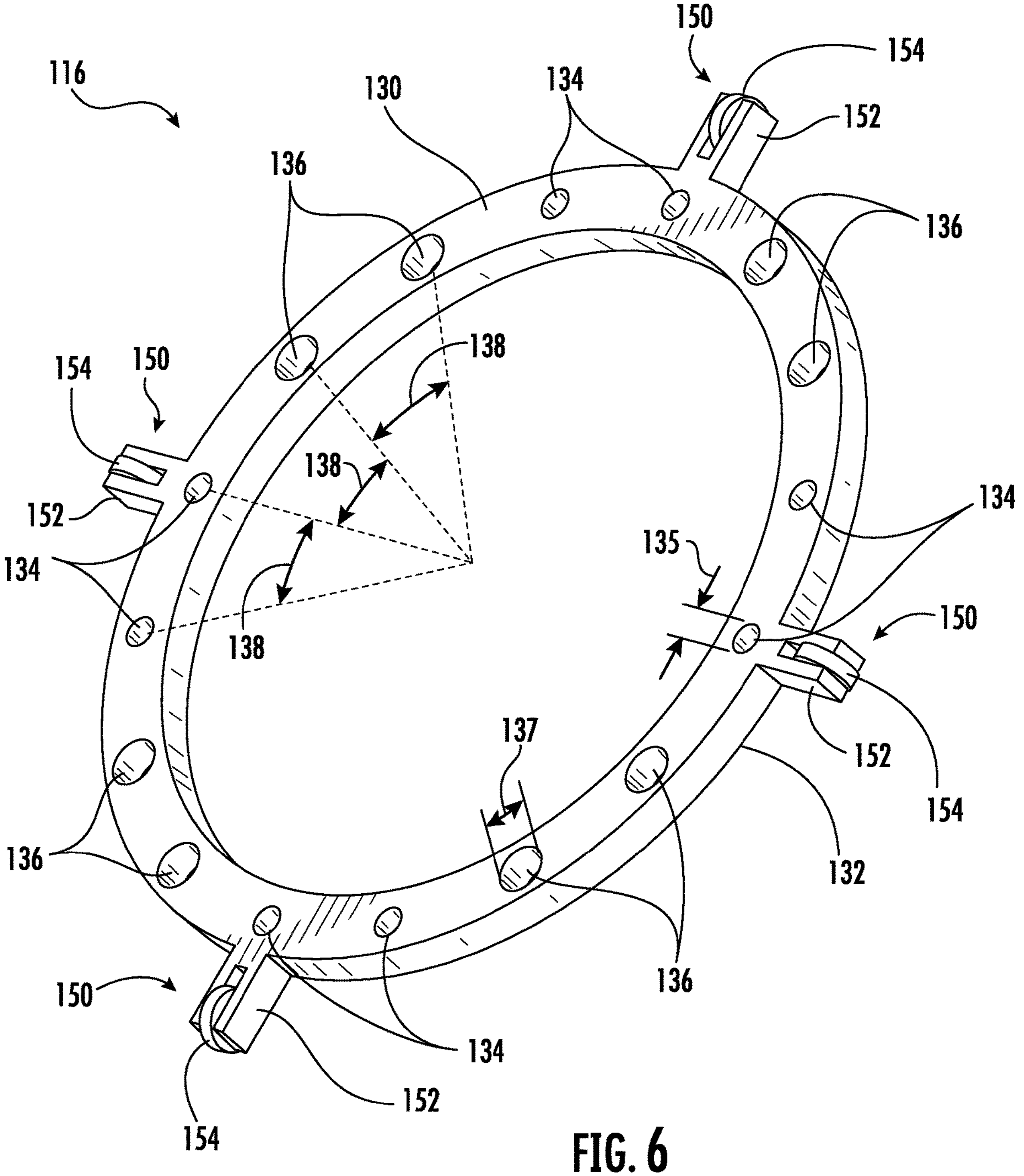
FIG. 6 illustrates a perspective view of one embodiment of a guide ring of the disclosed variable volume vessel in accordance with aspects of the present subject matter.

Referring particularly now to FIG. 6, a perspective view of one of the guide rings 116 described above is illustrated in accordance with aspects of the present subject matter. As shown, the guide ring 116 is generally ring-shaped and includes an upper surface 130 and a lower surface 132. An expandable/contractable bellows component 114 may be attached to the guide ring 116 at or adjacent to its upper surface 130 to form part of one bellow section 112 of the bellows 110, while another expandable/contractable bellows component 115 may be attached to guide ring 116 at or adjacent to its the lower surface 132 to form part of another bellow section 112 of the bellows 110.

Additionally, as shown in FIG. 6, a plurality of axially extending openings or holes 134, 136 are defined through the guide ring 116 between its upper and lower surfaces 130, 132. Specifically, the guide ring 116 includes a plurality of smaller "mounting holes" 134 and a plurality of larger "pass-through holes" 136 defined between the upper and lower surfaces 130, 132. As will be described below, the mounting holes 134 define relatively small outer dimensions (e.g., diameter 135 shown in FIG. 6) to allow an associated travel limit rod 122 to be coupled thereto without allowing portions of the rod 122 to pass through such holes 134. In contrast, the pass-through holes 136 define relatively larger outer dimensions (e.g., diameter 137 shown in FIG. 6) to allow a portion of a travel limit rod 122 to pass therethrough during expansion/contraction of the bellows 110.

It should be appreciated that the circumferential positioning/spacing of the various holes 134, 136 may generally be selected based on the circumferential positioning/spacing of the sets of travel limit rods 122 configured to be coupled to or engage with the guide ring 116 via the mounting holes 134 as well as the circumferential positioning/spacing of the sets of travel limit rods 122 configured to pass through the pass-through holes 136 during expansion/contraction of the bellows 110. For instance, in the illustrated embodiment, the guide ring 116 defines two sets of mounting holes 134 (with each set including four individual mounting holes 134), with the mounting holes 134 of each set being offset from one another by approximately 90 degrees to match the circumferential spacing of the individual sets of travel limit rods 122 associated with each bellow section 112. In such an embodiment, given the circumferential clocking of the adjacent sets of travel limit rods 122 described above, adjacent mounting holes 134 of the two sets of mounting holes 134 may be circumferentially offset from one another by an offset angle 138 that generally matches the circumferential clocking of such adjacent sets of travel limit rods 122, such as an angle ranging from greater than zero degrees to less than 45 degrees or greater than 5 degrees and less than 40 degrees or greater than 10 degrees and less than 35 degrees or greater than 15 degrees and less than 30 degrees. Additionally, in the illustrated embodiment, the guide ring 116 defines two sets of pass-through holes 136 (with each set including four individual pass-through holes 136), with the pass-through holes 136 of each set being offset from one another by approximately 90 degrees to match the circumferential spacing of the individual sets of travel limit rods 122 associated with each bellow section 112. In such an embodiment, given the circumferential clocking of the adjacent sets of travel limit rods 122 described above, adjacent pass-through holes 136 of the two sets of pass-through holes 136 may be circumferentially offset from one another by the offset angle 138 that generally matches the circumferential clocking of such adjacent sets of travel limit rods 122.

It should also be appreciated that each guide ring 116 may be circumferentially clocked relative to each immediately adjacent guide ring 116 of the bellows 110. For instance, in one embodiment each guide ring 116 may be circumferentially clocked relative to an adjacent guide ring 116 by the same offset angle as that used for the adjacent sets of travel limit rods 122 (and the same offset angle 138 used for the circumferential spacing of the guide ring holes 134, 136). In such instance, each mounting hole 134 of one set of mounting holes 134 defined in the lower guide ring 116 of a given bellow section 112 may be axially aligned with a mounting hole 134 of the other set of mounting holes 134 defined in the upper guide ring 116 of such bellow section 112.

Moreover, as shown in FIG. 6, the guide ring 116 may also include a plurality of guide rollers 150 extending radially outwardly from its outer circumference. In general, the guide rollers 150 may be configured to roll along the inner surface 194 of the outer housing 180 of the variable volume vessel 100 to allow for smooth linear travel within the housing 180 during expansion/contraction of the bellows 110. For instance, the guide rollers 150 may function to maintain the bellows 110 centered within the outer housing 180 (e.g., relative to the central axis 102 of the variable volume vessel 100) during expansion/contraction of the bellows 110. In addition, the guide rollers 150 may function to reduce the amount of friction between the bellows 110 and the outer housing 180 by providing a "rolling" interface between such components. As such, the guide rollers 150 may prevent binding of the bellows 110 relative to the outer housing 180 during expansion/contraction.

As shown in FIG. 6, in one embodiment, each guide roller 150 may include a roller bracket 152 extending radially outwardly from the outer circumference of the guide ring 116 and a roller component 154 supported by the bracket 152 for rotation relative thereto. In this regard, the roller component 154 of each guide roller 150 may be configured to contact the inner surface 194 of the outer housing 180 and "roll" along such surface 194 during expansion/contraction of the bellows 110. In one embodiment, the roller component 154 of each guide roller 150 may be coupled to its respective roller bracket 152 via a shaft (and optionally a bearing) to allow the roller component 154 to be supported relative to the bracket 152 for rotation relative thereto.

As shown in FIG. 6, the guide ring 116 includes four guide rollers 150 circumferentially spaced apart from one another around the outer circumference to the guide ring 116. For instance, in the illustrated embodiment, the guide rollers 150 of each guide ring 116 are spaced circumferentially apart from one another by approximately 90 degrees. However, in other embodiments, more or less guide rollers 150 may be provided in association with each guide ring 116, with such guide rollers 150 having any suitable circumferential spacing relative to one another. For instance, in one embodiment, a single guide roller 150 may be provided in association with each guide ring 116 or two or more guide rollers 150 may be provided in association with each guide ring 116.

Figure 7:
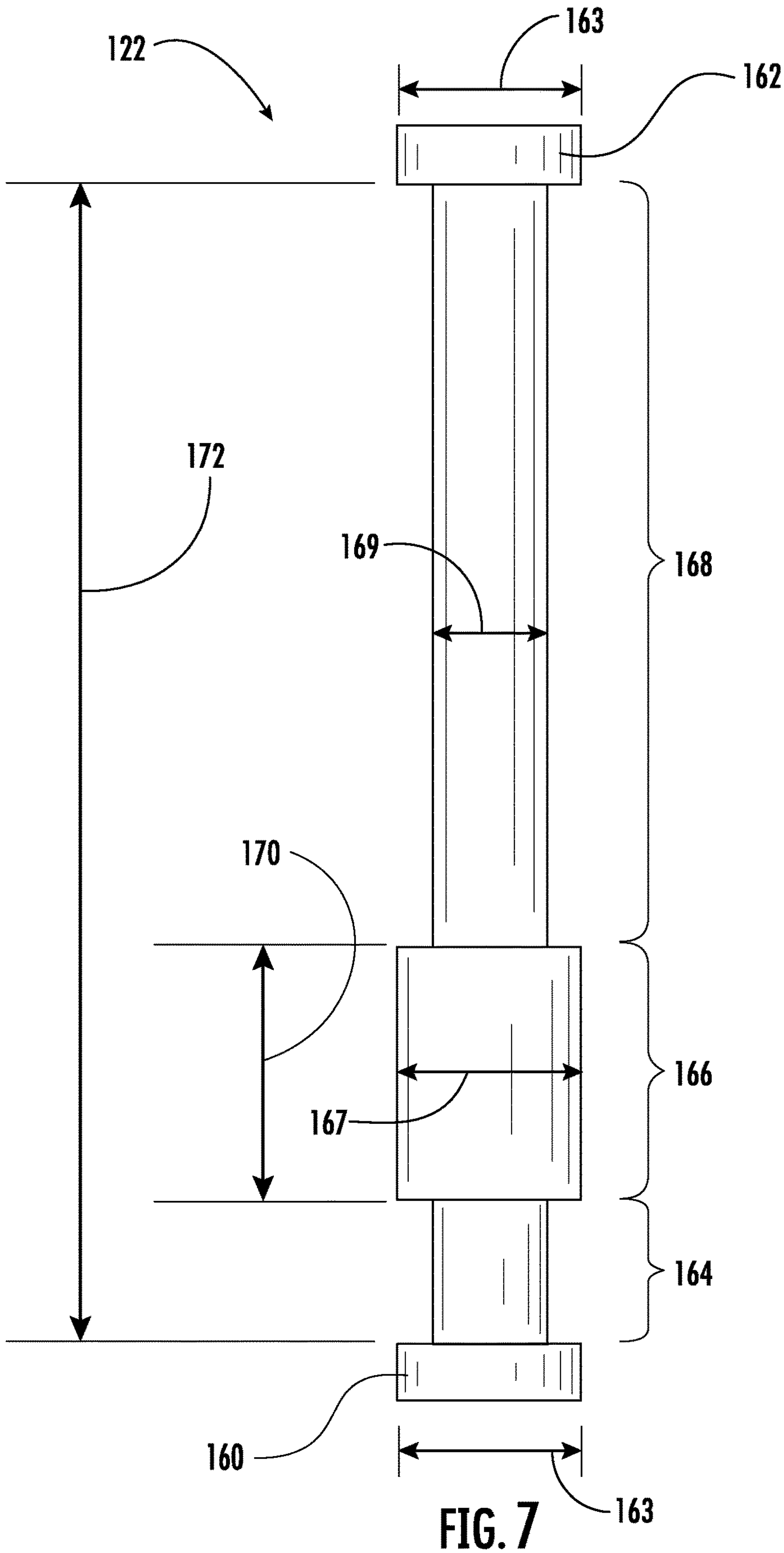
FIG. 7 illustrates a side view of one embodiment of a travel limit rod of the disclosed variable volume vessel in accordance with aspects of the present subject matter.

Referring now to FIG. 7, a side view of one of the travel limit rods 122 described above is illustrated in accordance with aspects of the present subject matter. As shown in the illustrated embodiment, the travel limit rod 122 extends longitudinally or axially between a lower head end 160 and an upper head end 162. In one embodiment, the head ends 160, 162 of the travel limit rod 122 may define the same outer dimension (e.g., diameter 163 shown in FIG. 7), with such diameter 163 being greater than the diameter 135 of the mounting holes 134 defined in each guide ring 116 but smaller than the diameter 137 of the pass-through holes 136 defined in each guide ring 116. However, in other embodiments, the head ends 160, 162 of the travel limit rod 122 need not define the same outer dimension (e.g., the same diameter 135). For instance, as will be appreciated by the description and drawings provided herein, in one embodiment, the diameter 163 of the lower head end 160 may be selected such that it is greater than the diameter 135 of the mounting holes 134 defined in each guide ring 116 (but not necessarily smaller than the diameter 137 of the pass-through holes 136 defined in each guide ring 116), while the diameter 163 of the upper head end 162 may be selected such that it is both greater than the diameter 135 of the mounting holes 134 defined in each guide ring 116 and smaller than the diameter 137 of the pass-through holes 136 defined in each guide ring 116.

As shown in FIG. 7, the travel limit rod 122 may include a mounting section 164 through which the travel limit rod 122 is configured to extend through a respective mounting hole 134 defined through the lower guide ring 116 of the associated bellow section 112. In such an embodiment, the lower head end 160 may be secured to the lower surface 132 of the lower guide ring 116 (e.g., via welding) to secure/fix the travel limit rod 122 to such ring 116. Since the diameter 163 of the lower head end 160 is greater than the diameter 135 of the mounting hole 134 of the guide ring 116, the interface between the lower surface 132 of guide ring 116 and the lower head end 160 of the travel limit rod 122 provides a fixed positional relationship between the rod 122 and ring 116.

The travel limit rod 122 also includes a contraction control section 166 that functions to set the minimum contraction/compression distance 120 for each associated bellow section 112. This contraction control section 166 may be formed by an integral part of the travel limit rod 122 (e.g., by being formed from a longitudinal section of the rod 122 defining an increased outer dimension, such an increased diameter) or by being formed from a separate component positioned on the rod 122 (e.g., a separate sleeve of an increased outer dimension, such an increased diameter, positioned on the rod 122 between its head ends 160, 162). In general, the outer dimension of the contraction control section 166 (e.g. diameter 167 shown in FIG. 7) may be greater than the diameter 135 of the mounting holes 134 defined in the upper and lower guide rings 116 of a given bellow section 112, thereby preventing the contraction control section 166 of the rod 122 from passing through such mounting holes 134. As a result, the contraction control section 166 may set the minimum contraction distance 120 of the associated bellow section 112. For instance, as shown in FIG. 5, when in the contracted state, the upper and lower guide rings 116 of each bellow section 112 may abut against the opposed upper and lower ends of the contraction control section 166, thereby preventing further contraction/compression of the associated bellow section 112.

Additionally, as indicated above, the travel limit rod 122 may also be configured to set the maximum expansion distance 118 for the associated bellow section 112. Specifically, as shown in FIG. 7, the travel limit rod 122 may include an expansion control section 168 extending axially between the contraction control section 166 and the upper head end 162, with such control section 168 being of reduced outer dimension (e.g., diameter 169 shown in FIG. 7) such that it can extend through the aligned mounting hole 134 of the upper guide ring 116 of the bellow section 112. Thus, as the bellows 110 expands from the fully contracted state, the upper guide ring 116 may slide along the expansion control section 168 until it abuts against the upper head end 162 of the travel limit rod 122, at which point further expansion of the bellow section 112 will be prevented due to engagement between the upper surface 130 of the upper guide ring 116 and the upper head end 162 of the rod 122. For instance, as shown in FIG. 3, when in the fully expanded state, the upper surface 130 of the upper guide ring 116 of each bellow section 112 abuts against the upper head end 162 of each associated travel limit rod 122 while the lower surface 132 of the lower guide ring 116 of each bellow section 112 abuts against the lower head end 160 of each associated travel limit rod 122, thereby preventing further expansion of the bellow section 112. In this regard, an axial length 172 (FIG. 7) of the travel limit rod 122 defined between its head ends 160, 162 generally functions to set the maximum expansion distance 118 for the associated bellow section 112. Specifically, since the maximum expansion distance 118 generally corresponds to the length defined between the upper and lower guide rings 116 of a given bellow section 112, such distance 118 may generally be equal to the axial length 172 of the travel limit rod 122 less the axial widths or heights of the upper and lower guide rings of the associated bellow section 112.

Referring briefly back to FIGS. 2-5, as the bellows 110 transitions from the fully expanded state (FIGS. 2 and 3) to the fully contracted state (FIGS. 4 and 5), the upper head ends 162 of the travel limit rods 122 associated with a given bellow section 112 may be configured to pass through the pass-through holes 136 of one or more guide rings 116 of an adjacent bellow section(s) 112. Specifically, as indicated above, the diameter 163 of the upper head end 162 of each travel limit rod 122 may be smaller than the diameter 137 of the pass-through holes 136, thereby allowing such head end 162 to pass through any aligned through holes 136 as the bellows 110 contracts. In this regard, it should be appreciated that, due to the circumferential clocking of the guide rings 116 as described above, the mounting holes 134 of the upper and lower guide rings 116 of a given bellow section 112 may be vertically aligned with the pass-through holes 136 of the guide ring(s) 116 of an adjacent bellow section(s) 112 positioned vertically above such bellow section 112 to allow the upper head ends 162 of the travel limit rods 122 to pass through the guide ring(s) 116 of the adjacent bellow section(s) 112 during contraction.

Referring back to FIG. 7, it should be appreciated that, with the above-described configuration of the travel limit rod 122, an axial length 170 of the contraction control section 166 may generally correspond to the minimum contraction height or distance 120 (FIG. 4) of the corresponding bellows component 114 of the respective bellows section 112. Similarly, as indicated above, it should be appreciated that the axial length 172 of the travel limit rod 122 defined between its head ends 160, 162 may generally set the maximum expansion height or distance 118 (FIG. 2) of the corresponding bellows component 114 of the respective bellows section 112.

Additionally, it should be appreciated that although the "outer dimensions" of the guide ring holes 134, 136 and the various sections/features of the travel limit rods 122 are described herein in terms of diameters (given their circular cross-sectional shapes), the "outer dimensions" of such components/sections/features may be defined in terms of any other suitable dimensional parameters. For instance, in embodiments in which the guide ring holes 134, 136 and/or the various sections/features of the travel limit rods 122 define cross-sectional shapes other than a circular cross-sectional shape (e.g., a rectangular-shaped cross-section), the "outer dimension" of such component/section/feature may be defined in terms of the width, length, or any other suitable dimensional parameter associated with the component/section/feature.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A variable volume vessel, comprising:

an outer housing;

a bellows positioned within the outer housing, the bellows comprising a plurality of bellow sections provided in series with one another, with each bellow section of the plurality of bellow sections being formed by a bellow component extending axially between an adjacent pair of upper and lower guide rings, the bellow component of each bellow section being configured to expand and contract such that a distance defined between the adjacent pair of upper and lower guide rings increases and decreases with expansion and contraction of the bellow component, respectively, wherein each guide ring comprises a plurality of mounting holes and a plurality of pass-through holes, the plurality of pass-through holes having an outer dimension greater than an outer dimension of the plurality of mounting holes, wherein a first mounting hole of the lower guide ring is axially aligned with a second mounting hole of the upper guide ring; and at least one travel limit rod provided in association with a respective bellow section of the plurality of bellow sections, the at least one travel limit rod being configured to prevent over-travel of the respective bellow section, wherein the at least one travel limit rod comprises:

an upper head end and a lower head end, wherein at least one of the upper head end or lower head end has an outer dimension that is less than the outer dimension of the plurality of pass-through holes, and a contraction control section extending axially between the upper and lower head ends and having an outer dimension greater than the outer dimension of the mounting holes, wherein an axial length of the contraction control section corresponds to a minimum contraction distance of the respective bellow section, and wherein, as the respective bellow section contracts to the minimum contraction distance, the at least one of the upper head end or lower head end of the at least one travel limit rod passes through a pass-through hole of a guide ring of a bellow section of the plurality of bellow sections positioned adjacent to the respective bellow section.

2. The variable volume vessel of claim 1, wherein the at least one travel limit rod being configured to prevent over-expansion of the respective bellow section.

3. The variable volume vessel of claim 1, wherein the at least one travel limit rod being configured to prevent over-contraction of the respective bellow section.

4. The variable volume vessel of claim 1, wherein the lower head end is positioned below the lower guide ring of the adjacent pair of upper and lower guide rings and the upper head end is positioned above the upper guide ring of the adjacent pair of upper and lower guide rings.

5. The variable volume vessel of claim 4, wherein the at least one travel limit rod extends through the first and second mounting holes such that the lower guide ring is positioned axially between the lower head end of the at least one travel limit rod and the contraction control section of the at least one travel limit rod and the upper guide ring is positioned axially between the upper head end of the at least one travel limit rod and the contraction control section of the at least one travel limit rod.

6. The variable volume vessel of claim 5, wherein, when the bellows is moved to a fully contracted state, the upper and lower guide rings engage against opposed sides of the contraction control section to prevent further contraction of the bellow section.

7. The variable volume vessel of claim 5, wherein an outer dimension of the upper and lower head ends of the at least one travel limit rod is greater than the outer dimension of the plurality of mounting holes.

8. The variable volume vessel of claim 5, wherein, when the bellows is moved to a fully expanded state, the lower head end of the at least one travel limit rod engages with the lower guide ring and the upper head end of the at least one travel limit rod engages with the upper guide ring to prevent further expansion of the bellow section.

9. The variable volume vessel of claim 1, wherein each bellow section of the plurality of bellow sections shares a common guide ring with an adjacent bellow section of the plurality of bellow sections such that at least one of the upper guide ring of a first bellow section of the plurality of bellow sections corresponds to the lower guide ring of a second bellow section of the plurality of bellow sections positioned immediately above the first bellow section or the lower guide ring of the first bellow section corresponds to the upper guide ring of a third bellow section of the plurality of bellow sections positioned immediately below the first bellow section.

10. The variable volume vessel of claim 1, wherein each guide ring further comprises at least one guide roller, the at least one guide roller being configured to engage an inner surface of the outer housing.

11. The variable volume vessel of claim 10, wherein the at least one guide roller comprises a roller bracket and a roller component supported by the roller bracket for rotation relative thereto, the roller component being configured to engage the inner surface of the outer housing during expansion and contraction of the bellow component.

12. The variable volume vessel of claim 10, wherein the at least one guide roller comprises a plurality of guide rollers spaced apart circumferential relative to one another around each of the upper and lower guide rings, each guide roller of the plurality of guide rollers being configured to engage the inner surface of the outer housing during expansion and contraction of the bellow component.

13. The variable volume vessel of claim 10, wherein the at least one travel limit rod is positioned closer to a central axis of the variable volume vessel than the at least one guide roller.

14. The variable volume vessel of claim 10, wherein the upper guide ring of the adjacent pair of upper and lower guide rings is circumferentially clocked relative to the lower guide ring of the adjacent pair of upper and lower guide rings to define an offset angle.

* * * * *